(12) United States Patent
Kadu

(10) Patent No.: US 12,489,719 B2
(45) Date of Patent: *Dec. 2, 2025

(54) SYSTEMS FOR AND METHODS OF UNIFIED PACKET RECIRCULATION

(71) Applicant: AVAGO TECHNOLOGIES INTERNATIONAL SALES PTE. LIMITED, Singapore (SG)

(72) Inventor: Sachin P. Kadu, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,137

(22) Filed: Mar. 7, 2024

(65) Prior Publication Data
US 2024/0214330 A1    Jun. 27, 2024

Related U.S. Application Data

(63) Continuation of application No. 17/513,761, filed on Oct. 28, 2021, now Pat. No. 11,949,605.

(51) Int. Cl.
*H04L 49/9057*    (2022.01)
*H04L 49/9005*    (2022.01)

(52) U.S. Cl.
CPC ...... *H04L 49/9057* (2013.01); *H04L 49/9005* (2013.01)

(58) Field of Classification Search
CPC . H04L 49/9057; H04L 49/9005; H04L 1/243; H04L 47/6225; H04L 49/253; H04L 49/3063; H04L 49/90; H04L 69/22; H04L 49/208; H04L 49/9042
See application file for complete search history.

(56) References Cited

U.S. PATENT DOCUMENTS

| | | | | |
|---|---|---|---|---|
| 6,145,032 A | * | 11/2000 | Bannister | H04L 49/90 710/56 |
| 7,136,381 B2 | * | 11/2006 | Battle | H04L 45/00 370/403 |
| 8,520,675 B1 | * | 8/2013 | Frailong | H04L 49/90 370/391 |
| 8,571,024 B2 | | 10/2013 | Tatar et al. | |
| 10,050,854 B1 | * | 8/2018 | Licking | H04L 45/74 |
| 10,419,366 B1 | * | 9/2019 | Kim | H03M 13/09 |
| 10,454,833 B1 | * | 10/2019 | Bosshart | H04L 49/3063 |
| 10,608,939 B1 | * | 3/2020 | Kim | H04L 43/062 |
| 11,456,970 B1 | * | 9/2022 | Bas | H04L 45/745 |

(Continued)

FOREIGN PATENT DOCUMENTS

CN    104038327 A    9/2014

OTHER PUBLICATIONS

EP Search Report on non-Foley case related to US Dtd Feb. 17, 2023.

(Continued)

*Primary Examiner* — Wutchung Chu
(74) *Attorney, Agent, or Firm* — Foley & Lardner LLP

(57) ABSTRACT

An apparatus includes an ingress data buffer, an ingress processor, an egress processor, and a recirculation data buffer. The apparatus is configured to provide unified packet recirculation via the recirculation data buffer and a single recirculation port on the ingress data buffer. The apparatus can be a switch, router or other network device.

20 Claims, 4 Drawing Sheets

(56) References Cited

U.S. PATENT DOCUMENTS

| | | | |
|---|---|---|---|
| 11,621,904 B1* | 4/2023 | Matthews | H04L 43/10 |
| | | | 709/241 |
| 2007/0019661 A1* | 1/2007 | Rowett | G06F 8/427 |
| | | | 370/419 |
| 2007/0183415 A1 | 8/2007 | Fischer et al. | |
| 2016/0065484 A1* | 3/2016 | Suzuki | H04L 47/623 |
| | | | 370/415 |
| 2019/0182135 A1 | 6/2019 | Bharadwaj et al. | |
| 2020/0053029 A1* | 2/2020 | Javadi | H04L 49/3063 |
| 2020/0313955 A1* | 10/2020 | Kodeboyina | H04L 45/745 |
| 2020/0322465 A1* | 10/2020 | Wang | H04L 67/566 |
| 2021/0176171 A1* | 6/2021 | Frink | H04L 49/901 |
| 2021/0234768 A1 | 7/2021 | Pang et al. | |
| 2021/0243253 A1* | 8/2021 | Pang | H04L 12/1854 |
| 2021/0336883 A1* | 10/2021 | Pudiyapura | H04L 45/748 |
| 2021/0409487 A1* | 12/2021 | Pi | H04L 67/1004 |
| 2022/0045945 A1* | 2/2022 | Subrahmanya | H04L 45/38 |
| 2022/0060569 A1* | 2/2022 | Wang | H04L 47/41 |
| 2022/0078119 A1* | 3/2022 | Goyal | H04L 47/25 |
| 2022/0303364 A1* | 9/2022 | Nandakumaran | H04L 12/4633 |
| 2022/0400083 A1* | 12/2022 | Chandrasekaran | H04L 47/562 |
| 2023/0139559 A1* | 5/2023 | Kadu | H04L 1/243 |
| | | | 370/412 |
| 2023/0224217 A1* | 7/2023 | Subrahmanya | H04L 49/3063 |
| | | | 370/254 |

OTHER PUBLICATIONS

Final Office Action on U.S. Appl. No. 17/513,761 Dtd Aug. 11, 2023.

Non-Final Office Action on U.S. Appl. No. 17/513,761 Dtd Apr. 5, 2023.

Notice of Allowance on U.S. Appl. No. 17/513,761 Dtd Dec. 7, 2023.

Foreign Action other than Search Report on non-Foley case related to US Dtd Oct. 10, 2024.

Chinese office action on CN Appln. No. 202211073072.X dated Mar. 20, 2025.

* cited by examiner

SYSTEMS FOR AND METHODS OF UNIFIED PACKET RECIRCULATION

CROSS REFERENCE TO RELATED PATENT APPLICATIONS

This application is a continuation of U.S. patent application Ser. No. 17/513,761, filed Oct. 28, 2021, the entire disclosure of which is incorporated by reference herein.

FIELD OF THE DISCLOSURE

This disclosure generally relates to systems and methods for communicating data in a network environment, and, more specifically, the disclosure relates to systems for and methods of reintroducing, looping back, or otherwise recirculating packets, frames or other data units.

BACKGROUND OF THE DISCLOSURE

The communications industry is rapidly changing to adjust to emerging technologies and ever increasing customer demand. Demands for new network applications and higher performance is requiring communication networks to operate at faster speeds (e.g., higher bandwidth). Many communication providers are using packet switching technology to achieve these goals. Storage, communications, entertainment, and computer systems utilize switches such as routers, packet switching systems, and other network data processing devices to communicate packets, frames or other data units.

Switches are hardware components of networks which control the distribution of messages or data packets, frames or other data units based on address information contained within each data packet. The term data packet as used herein is not limited to a specific protocol or format of data unit or frame. A switch can receive a packet on one ingress port, process the packet in an ingress pipeline, process the packet in an egress pipeline and replicate the packet to the appropriate egress port or ports. Recirculation is a technique employed by switches to allow a packets to re-enter packet processing. Packet recirculation can involve repeating ingress and egress processing on a packet once it has already traversed the egress pipeline.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
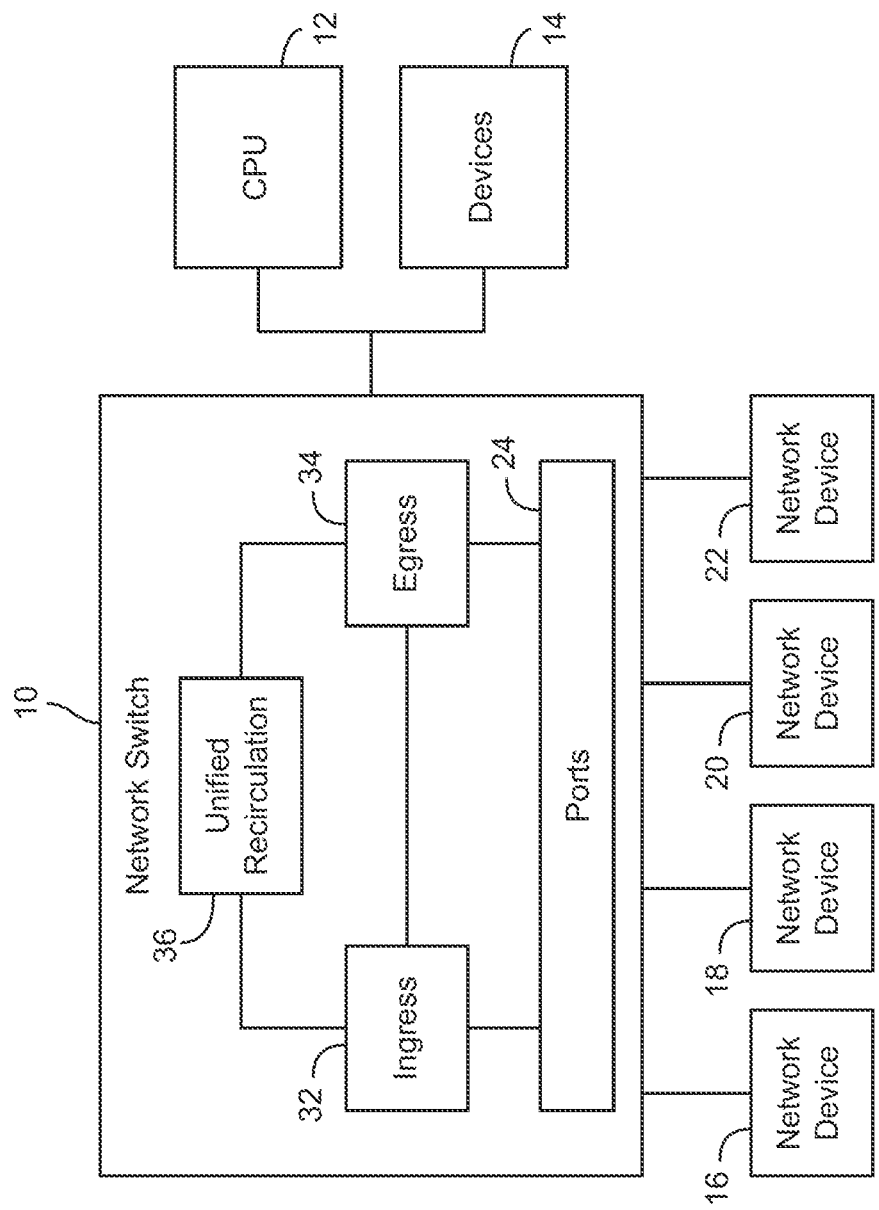
FIG. 1 is a general block diagram depicting a network device within a network according to some embodiments.

The details of various embodiments of the methods and systems are set forth in the accompanying drawings and the description below.

DETAILED DESCRIPTION

Network devices, such as switches, provide unified egress decision making (e.g., egress pipeline recirculation (EPRC)) for recirculation and ingress decision making (e.g., loopback port decision making) for recirculation in some embodiments. The unified approach advantageously reduces complexity while requiring less area than a non-unified approach (e.g., 3.5 millimeter squared ($mm^2$) vs. 27 $mm^2$)) in some embodiments. Extra and separate ports for loopback and egress recirculation are not required in some embodiments. In a non-unified packet recirculation architecture, loopback and EPRC characteristics, configurations, programming model, formats, ports, scheduling, etc. are separated. In some embodiments, a uniform programming model makes decisions for packet recirculation in the ingress pipeline and the egress pipeline at fraction of the cost, without the complexity of a non-uniform model and while enabling new features. As used herein the term recirculate or recirculation can refer to egress and ingress recirculation, reinsertion, loopback, reintroduction and other forms of reentering a data unit (e.g., frame, packet, etc.) into an ingress or egress pipeline.

In a non-unified packet recirculation architecture, decisions to route packets are made in the ingress pipeline and the egress pipeline cannot make decisions to re-route the packets after dequeuing from the memory manager. This can be a significant limitation for some features since certain information is only available after dequeuing. The unified approach can support additional features which cannot be supported in a non-unified approach in some embodiments.

Data centers use recirculation in visibility/debug and instrumentation/telemetry features according to some applications. The unified packet recirculation systems and methods not only unify and simplify recirculation for these and other applications, but also enable many new features and optimize many other legacy features at a fraction of the cost with improved bandwidth in some embodiments. For example, conventional loopback recirculation cannot support multiple copies. If multiple copies are needed, a memory manager needs to be updated for the multiple copies at the cost of critical path bandwidth and introducing additional passes for the packets which adds latency, more complexity for the programming model and additional burden on the central processing unit.

In some embodiments, systems and methods make decisions for packet recirculation in the ingress and egress pipeline. In some embodiments, the systems and methods provide a uniform and consistent programming model for loopback and recirculation and uniform and consistent formats for loopback and recirculation. Recirculation triggered by the ingress pipeline can have multiple copies as well as different classes of service in a redirection buffer (RDB) for buffering and scheduling. Multiple copies of the same packet can be triggered by the ingress and egress pipeline simultaneously without any out-of-order processing in some embodiments. Unified packet recirculation can be used effectively to generate and reinsert back the extra copy with any number of metadata bytes and custom headers for instrumentation/telemetry applications. Improved bandwidth (BW) of 13.5 Gigabits per second (Gbps) guaranteed can be achieved in some embodiments versus 2.7 Gbps for a conventional packet recirculation scheme.

Some embodiments, relate to a network device including an ingress pipeline, an egress pipeline, an ingress data buffer with a recirculation port, and a recirculation data buffer coupled to the recirculation port. The egress pipeline and the ingress pipeline are configured to mark a packet for recirculation. The packet is provided to the recirculation data buffer for provision to the recirculation port, and the ingress data buffer is configured to provide the packet to the ingress pipeline.

Some embodiments relate to a method of recirculating a packet. The method includes marking a first packet for recirculation in an ingress pipeline, providing the first packet to an egress pipeline, and providing the first packet from the egress pipeline to an egress data buffer and providing a copy of the first packet at a recirculation data buffer. The method also includes providing the copy of the first packet to an ingress data buffer from the recirculation data buffer.

Some embodiments relate to an apparatus. The apparatus includes an ingress data buffer, an ingress processor, an egress processor, and a recirculation data buffer. The apparatus is configured to provide unified packet recirculation via the recirculation data buffer and a single recirculation port on the ingress data buffer.

Some embodiments relate to an apparatus. The apparatus includes an ingress data buffer, an ingress processor, an egress processor, and a recirculation data buffer. The recirculation buffer is configured to copy or edit a packet and provide the copied or edited packet to a recirculation port on the ingress data buffer.

In some embodiments, the egress pipeline is configured to provide edit instructions to the recirculation buffer. In some embodiments, the edit instruction include an offset, update, data, or action instruction. In some embodiments, the recirculation data buffer is configured to make more than two copies of the data packet.

Network Device

With reference to FIG. 1, an exemplary configuration of a network 8 includes a network device 10. The network device 10 may be a hardware-based device such as network switch for moving data packets in network 8 according to address information contained within the packet itself. In some embodiments, the network device 10 may additionally and/or alternatively perform the function of a router and be configured to move packets in and across networks, or in general be any other device configured to move data in or across networks. In addition, although the disclosure may refer at times to a "switch" and "switching," for the purposes of this description, the terms "switch" and "switching" may include both switching and routing.

The network device 10 is a network switch functionally connected to Central Processing Unit (CPU) 12 and other external devices 14 in some embodiments. External devices 14 may be other external processors, external memory, other network devices such as servers, routers, or computers, and/or other network switches, access points and routers to expand the switching capability. CPU 12 can be used to program the network device 10 based on desired rules or protocols for packet processing.

Data received from network device(s) 16, 18, 20, and 22 at ports 24 can be processed by network device 10 independent of CPU 12 based on the programmed instructions. The processed data is redistributed across the ports 24 to the appropriate network device(s) 16, 18, 20, and 22 based on the programmed packet processing rules. The network device 10 can be an integrated, modular, single chip solution. In some embodiments, network device 10 includes an application-specific integrated circuit (ASIC) constructed according to the packet processing rules, a field programmable gate array (FPGA), a communications processor, or any other type and form of dedicated silicon logic or processing circuitry capable of processing and switching packets or other data units. Additionally and/or alternatively, network device 10 can be a plurality of individual components on a circuit board, or implemented on a general purpose device, or general purpose devices, through software.

While the word "packet" is used, it should be understood that the disclosed process can work with other types of data including cells, frames, datagrams, bridge protocol data unit packets, packet data, etc. Packet processing can include reading, modifying, and classifying the packet, changing the packet forwarding behavior, removing and/or appending information to the packet, mirroring the packet to another port, storing the packet in a buffer, reordering the packet in a series of packets, sending the packet to a service queue, recirculating or looping back a packet, or changing the type of packet. For example, network device 10 can replicate the packet and choose a specific port of ports 24 as the egress port, which can thereafter forward the packet to network device 10 or other devices 16, 18, 20, and 22 or networks. The egress port and final network device destination are determined by data contained in the packet. Forwarding a packet can involve witching the packet within network 8 to one or more egress ports (e.g., of ports 24) of the network device 10. In forwarding, a packet can be replicated and sent to multiple destinations on a single egress port or across multiple egress ports. In some embodiments, the final packet destination is a successive network device, and the packet is forwarded from network device 10 through a series of network devices before the final destination is reached.

The packet contains information for replicating and forwarding the packet to the appropriate destinations on the network. A packet is originally received on a source port noted by network device 10 and it can then be replicated and forwarded to the same or one or more other ports that belong to the multicast group indicated by the information contained in the packet. In multicast, packets tagged as belonging to a multicast group are sent to subscribed destinations that have indicated to network device 10 that they belong to the multicast group. The single packet can be replicated and forwarded to a plurality of destinations without flooding the network, such that only a single packet is transmitted to each destination.

Network device 10 includes an ingress pipeline 32, an egress pipeline 34, a unified recirculation module or circuit 36, and ports 24. An ingress pipeline 32 processes received packets on ports 24, and an egress pipeline 34 processes packets for transmission from ports 24. The unified recirculation circuit 36 provides recirculation decisions and processing for network device 10. Advantageously, the unified recirculation circuit 36 can interact with and be part of both the ingress pipeline 32 and egress pipeline 34 when reintroducing or recirculating packets. The packets can be reintroduced at the ingress pipeline 32 based on decision made at the ingress pipeline 32 or at the egress pipeline 34 in some embodiments.

In some embodiments, unified recirculation circuit 36 uses a uniform and consistent programming model for loopback and egress recirculation without requiring extra and separate ports required for loopback and recirculation. The network device 10 supports multiple copies for ingress pipeline triggered recirculation as well as different classes of service for buffering and scheduling. Multiple copies of the same packet can be triggered by ingress pipeline 32 and egress pipeline 34 simultaneously without out-of-order processing issues in some embodiments. In some embodiments, the loopback logic and queues can completely be removed if flows do not use it. The ingress pipeline 32 can indicate a decision to mirror to the egress pipeline 34 which handles the recirculation and mirroring operations.

Figure 2:
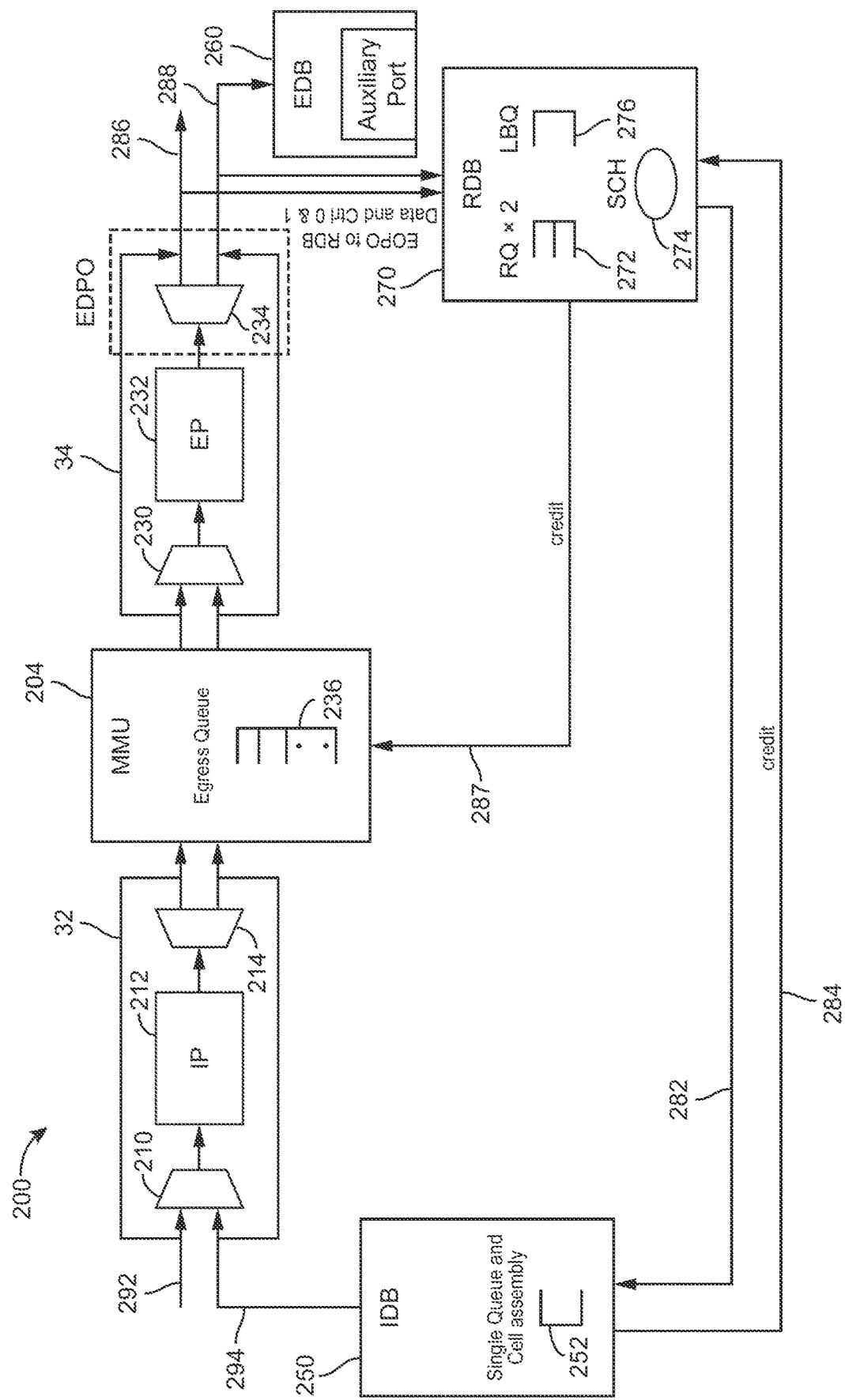
FIG. 2 is a more detailed block diagram of a portion of an ingress pipeline and an egress pipeline of the network device illustrated in FIG. 1 according to some embodiments.

With reference to FIG. 2, a portion 200 of network device 10 includes ingress pipeline 32, egress pipeline 34, a memory management unit 204, an ingress data buffer 250, an egress data buffer 260, and a redirection or recirculation data buffer 270. Portion 200 can be provided for ports 24 (FIG. 1) or a subset of ports in some embodiments. The portion 200 can include additional ingress data buffers similar to ingress data buffer 250 (e.g., 1 or more) and additional egress data buffers (e.g., 1 or more) similar to egress data buffer 260. In some embodiments, the network device 10 includes 16 portions 200, each including one additional ingress buffer and one additional egress buffer. In some embodiments, ingress data buffer 250 and egress data buffer 260 each include connections to 10 front panel ports and one auxiliary or recirculation/loop back port. Five ingress data buffers of the 32 ingress data buffers may include an auxiliary port for CPU 12 and management while the 26 remaining ingress data buffers do not include an auxiliary port. Similarly, four egress data buffers of the 32 egress data buffers may include an auxiliary port (e.g., port 436 in FIG. 4) for CPU 12 and management while the 27 remaining egress data buffers do not include an auxiliary port.

The ingress pipeline 32 includes a multiplexer 210, an ingress processing pipeline 212, and a multiplexer 214. The egress pipeline 34 includes a multiplexer 230, egress processing pipeline 232, and a multiplexer 234. Ingress processing pipeline 212 is configured to perform packet processing before processing by memory management unit 204 and egress processing pipeline 232 is configured to perform packet processing after processing by memory management unit 204 In some embodiments, the ingress packet processing operations include determining where to send the packet out of network device 10 (to which ports 24 (FIG. 1)).

Ingress port 292 is coupled to a first input of multiplexer 210, and ingress data buffer 250 is coupled to a second input of multiplexer 210 at ingress port 294. Ingress port 292 is coupled to a first output of multiplexer 214, and ingress port 294 is coupled to a second output of multiplexer 214. Egress port 286 is coupled to a first input of multiplexer 230 at the egress data processing output (EDPO), and egress port 288 is coupled to a second input of multiplexer 230 at the egress data processing output. Egress port 286 is coupled to a first output of multiplexer 234, and egress data buffer 260 is coupled to a second output of multiplexer 234 at egress port 288. Paths through and around ingress processing pipeline 212 and egress processing pipeline 232 can be made using multiplexers 210, 214, 230 and 234.

Ingress port 294 is coupled to ingress data buffer 250, and port 288 is coupled to egress data buffer 260 and recirculation data buffer 270. Port 286 is coupled to recirculation data buffer 270. Port 292 can be coupled to one of the additional ingress data buffers, and port 286 can be coupled to one of the additional ingress data buffers.

The ingress data buffer 250 includes a queue or cell assembly unit 252. Recirculation data buffer 270 includes a recirculation queue 272 and a scheduler 276. Recirculation data buffer 270 includes a loop back queue 274. Loop back queue 274 can be included in recirculation queue 272, or recirculation queue 272 can replace loop back queue 274 in some embodiments. Recirculation data buffer 270 is coupled to a recirculation port 282 of ingress data buffer 250 and a credit signal line 284. Recirculation data buffer 270 is coupled to a recirculation port 282 of ingress data buffer 250 and to a credit signal line 284 between recirculation data buffer 270 and ingress data buffer 250. Recirculation data buffer 270 is coupled to memory management unit 204 by a credit signal line 287. Recirculation data buffer 270 returns credits with cell length from the egress processing pipeline 232 for dropped/truncated packets at enqueue of the recirculation data buffer 270 and enqueued packets at dequeue of the recirculation data buffer 270

Memory management unit 204 includes a queue buffer 236 (e.g., 8 egress queues). The memory management unit 204 manages transfer data at line rate and handles congestion without dropping packets under varied and adverse traffic conditions in some embodiments. Queue buffer 236 is used to track dequeue operations for loop back queue 274 via credit line 287 in some embodiments. Memory management unit 204 performs network address translation (NAT) that redirects a communication request from one address and port number combination to another while the packets are traversing network device 10. Memory management unit 204 is configured to perform per port thresholding in some embodiments.

After ingress processing pipeline 212 finishes performing the ingress processing operations, the packet is sent to the memory management unit 204 for packet buffering and from memory management unit 204 for egress processing to egress processing pipeline 232. Ingress processing pipeline 212 and egress processing pipeline 232 can include hardware components, storage, and processors for performing the ingress and egress processing. Ingress processing pipeline 212 and egress processing pipeline 232 can share processors and other components that perform ingress and egress processing operations or have distinct hardware and processor components. The egress processing operations can include forwarding the packet out of the determined egress port of the network device 10.

Ingress processing pipeline 212 is configured to inspect metadata associated with packets. In some embodiments, ingress processing pipeline 212 stores a set of rules that each specifies a pattern and a set of actions. While inspecting a packet, if a rule in the set of rules with a pattern that matches the metadata, the set of actions specified in the rule with the matching pattern. Ingress processing pipeline 212 is configured to generate system headers (i.e., metadata) associated with packets. For example, an ingress header manager may generate a set of system headers for a packet and append them to the packet. As such, these system headers are separate from the original packet (i.e., the system headers are not included in the original packet).

Egress processing pipeline 232 is configured to inspect metadata associated with packets. In some embodiments, egress processing pipeline 232 stores a set of rules that each specifies a pattern and a set of actions. During inspection of a packet, if a rule in the set of rules with a pattern that matches the metadata, the set of actions specified in the rule with the matching pattern. Egress processing pipeline 232 is responsible for managing system headers associated with packets. For example, in some instances, egress processing pipeline 232 can determine which, if any, system headers associated with a packet, are to be kept before the packet is sent out of egress processing pipeline 232.

Portion 200 is configured for unified packet recirculation. In some embodiments, the microarchitecture for unified packet recirculation provides a 128B cell buffer per data path and seamless bandwidth sharing with recirculation port 282

(e.g., 13.3 Gigabits per second (Gbps)-170.99 Gbps bandwidth for 64B packets and 64.35 Gbps-316.7 Gbps for greater than 294B packets). The microarchitecture for unified packet recirculation is configured so that portion 200 makes an extra copy and reinserts the extra copy into the ingress data buffer 250 via a single port (e.g., port 282). The extra copy can include any number of metadata bytes and/or custom headers. In some embodiments, an extra copy needed for instrumentation, visibility, or debug does not have to be generated by memory management unit 204 and does not have to be re-inserted back into the ingress pipeline 32 by CPU 12 (FIG. 1). This aspect of some embodiments reduces logic, processing and bandwidth overhead of memory management unit 204 and CPU 12 when generating, receiving and re-inserting back the extra copy. In some embodiments, the operation does not mix the critical path (for memory management unit 204) and slower path for CPU 12 which incurs huge latency. Unified packet recirculation provides a non-critical path through the hardware without slow path latency and software processing overheard. Packets are not limited by and do not have to comply with standard CPU header formats to carry data from the egress pipeline 34 to the ingress pipeline 32. Custom headers can have any number of metadata bytes as packets do not go through processing by CPU 12 in some embodiments.

In some embodiments, egress processing pipeline 232 is configured to make decisions for recirculation using identical or similar hardware for ingress and egress scheduled recirculation in some embodiments. For example, packets for loop back can be marked by the ingress processing pipeline 212, and egress processing pipeline 232 can provide such packets to recirculation data buffer 270 in response to the marking. The marking can be a field in metadata or other information. A packet can be marked for recirculation if the packet needs to be mirrored or reprocessed by ingress processing pipeline 212. Egress processing pipeline 232 can similarly select packets for recirculation.

In some embodiments, egress processing pipeline 232 can use the EPRC-loopback header for flows requiring a second pass in the ingress pipeline 32. Flows that do not require processing in the ingress pipeline 32 in a second pass can use an egress pipeline recirculation ingress pipeline (EPRC-IP)—stream of bytes model header (SOBMH). In such instances, the ingress pipeline 32 treats the packet as SOBMH, without any updates to legacy SOBMH logic. The ingress switch state (Isw) copies the EPRC-IP-SOBMH header bytes to a bus that connects ingress pipeline 32 to egress pipeline 34 directly to be used by egress pipeline 34 in a second pass. In some embodiments, the loopback header is updated to map new EPRC flows to it and make it consistent with the SOBMH/CPU-TX header. In some embodiments, this technique is less intrusive since actual variable length header for different flows is generated and consumed inside ingress pipeline 32 and egress pipeline 34 and is not exposed to egress data path output, ingress data path input, software, or a user by keeping the SOBMH/CPU-Tx header the same or updating the loopback header (and all its EPRC related sub-types) to be consistent. The egress processing pipeline 232 continues to support a shaping interface for the loopback port (e.g., port 282) in some embodiments. The port 282 never receives packets with an in band flow analyzer term in some embodiments. This ensures that the shaping interface does not need to handle special cases in some embodiments.

A pass-through highway can be provided from the egress packet modification stage in the egress pipeline 34. This saves another interface of 302B+ control to each data path pair (e.g., 16 of them) from the egress pipeline 34, thereby saving space and power in some embodiments. Only 64 more bytes required over a 302B interface to the data path which need not be accessed by an egress field processor subsystem or access control logic.

The recirculation data buffer 270 is configured to perform egress pipeline specific packet modifications instead of the egress pipeline 34 in some embodiments. By making such modifications in the recirculation data buffer 270, a 302 byte bus across the egress pipeline 34 and across the data paths is not required, thereby saving area/power. In some embodiments, the recirculation data buffer 270 performs any required modifications after dequeue by the recirculation data buffer 270, thereby working on much smaller data widths to reduce muxing/pipelining cost and having only one instance of logic per recirculation data buffer 270 instead of two (e.g., one or ingress and one for egress recirculation, thereby saving area and power). The recirculation data buffer 270 performs credit loop operations for de-queueing using credit lines 284 and 287. In some embodiments, lines 284 and 287 are single wire.

In some embodiments, the recirculation data buffer 270 always receives the tail timestamps as done for switched copies and the recirculation data buffer 270 receives the maximum transmission unit (MTU) fail error indications on the control bus which it chooses to ignore or honor, per copy, based on control signals from egress processing pipeline 232. The recirculation data buffer 270 never has to pad a packet back to 64B and inputs and outputs pre-inband flow analyzer term packets in some embodiments. After dequeue and modifications in the recirculation data buffer 270, a start of fresh packet occurs. Other than the first 16B of loopback header, all other bytes including byes for the extended header are considered as packet data in some embodiments.

In some embodiments, exchanges between the egress data buffer 260 and the recirculation data buffer 270 are not required and changes to the packet shaping loop with memory management unit 204 are not required. The egress data buffer 260 does not implement the credit loop interface for loopback operations with memory management unit 204 and advantageously does not require buffers/queues implemented for loopback operations as used conventionally.

The recirculation data buffer 270 using scheduler 276 reserves space for loopback packets according to the credits in use between recirculation data buffer 270 and memory management unit 204. The recirculation queue 272 is configured to perform programmable bandwidth allocation across EPRC packets and loopback packets. Scheduler 276 supports allocation granularity of (Total Loopback BW)/32 for the ports 24 (FIG. 1) and sharing between EPRC and loopback flows. Multiple copies per enqueued packet, independently truncatable at 1 cell, 2 cells, or sending the entire packet are supported in some embodiments. Errors happening on any cells are propagated to start of packet (SOP) to assist fast-read and drop on dequeue, thereby preserving bandwidth in some embodiments. In some embodiments, the recirculation queue 272 supports configurable ignoring of maximum transfer unit (MTU) failures per copy and provides class of service support for input buffering and scheduling by scheduler 276.

Figure 3:
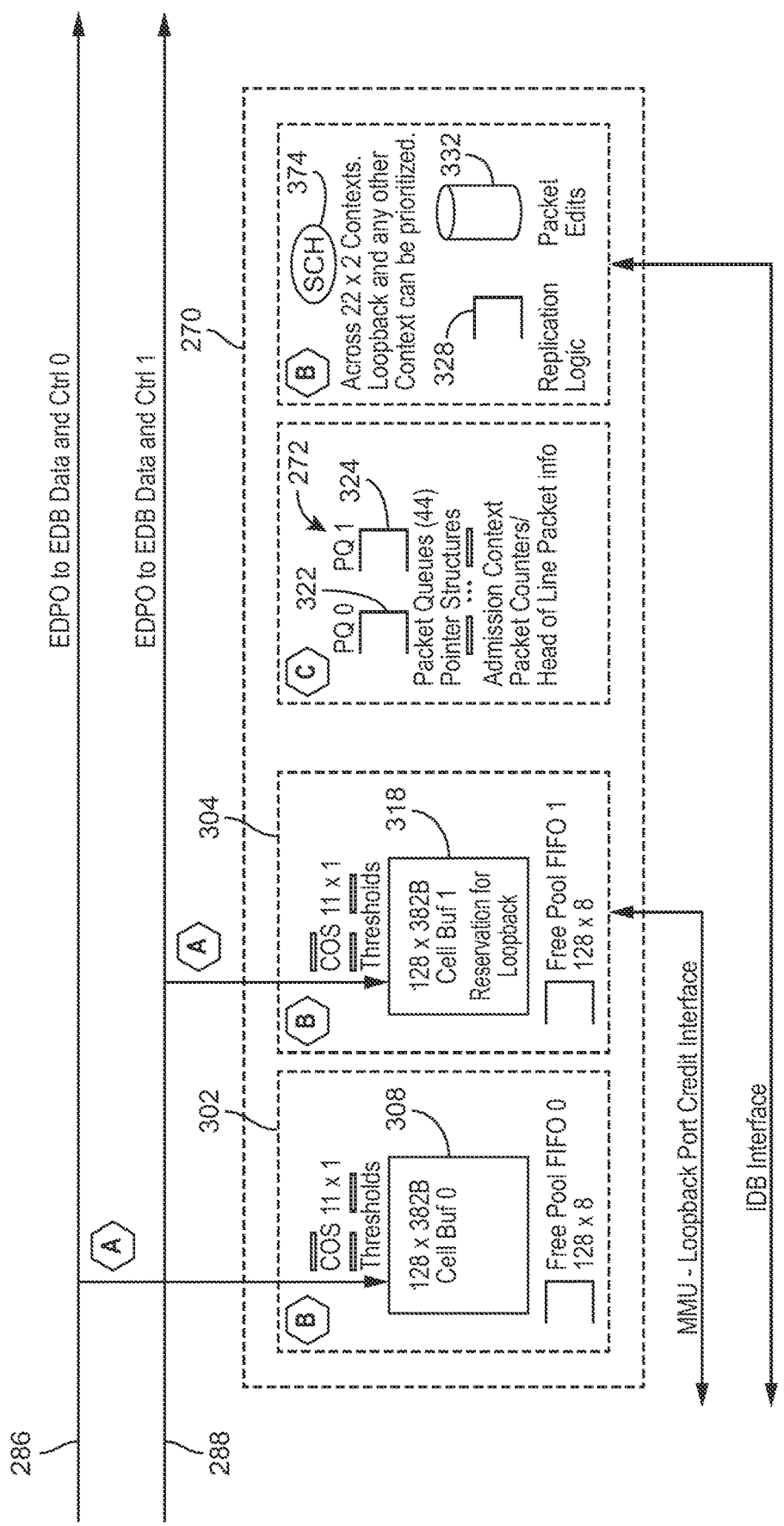
FIG. 3 is a more detailed block diagram of a recirculation data buffer for the network device illustrated in FIG. 1 according to some embodiments.

With reference to FIG. 3, a packet 302 received from port 286 is stored in a cell buffer 308 and a copy 304 from port 288 is stored in a cell buffer 318. The copy 304 is marked as reserved for loop back or recirculation. The copy 304 is made in the recirculation data buffer 270 by replication logic 374. Packet edits are made using packet editor 332 in some embodiments. (e.g., See Table I below). Recirculation queue 272 includes a queue 322 and a queue 324 for storing pointer structures, admission context, packet counters, and head of line packet information. Scheduler 374 prioritizes and schedules transfers (e.g., loopback, recirculation and other contexts).

Figure 4:
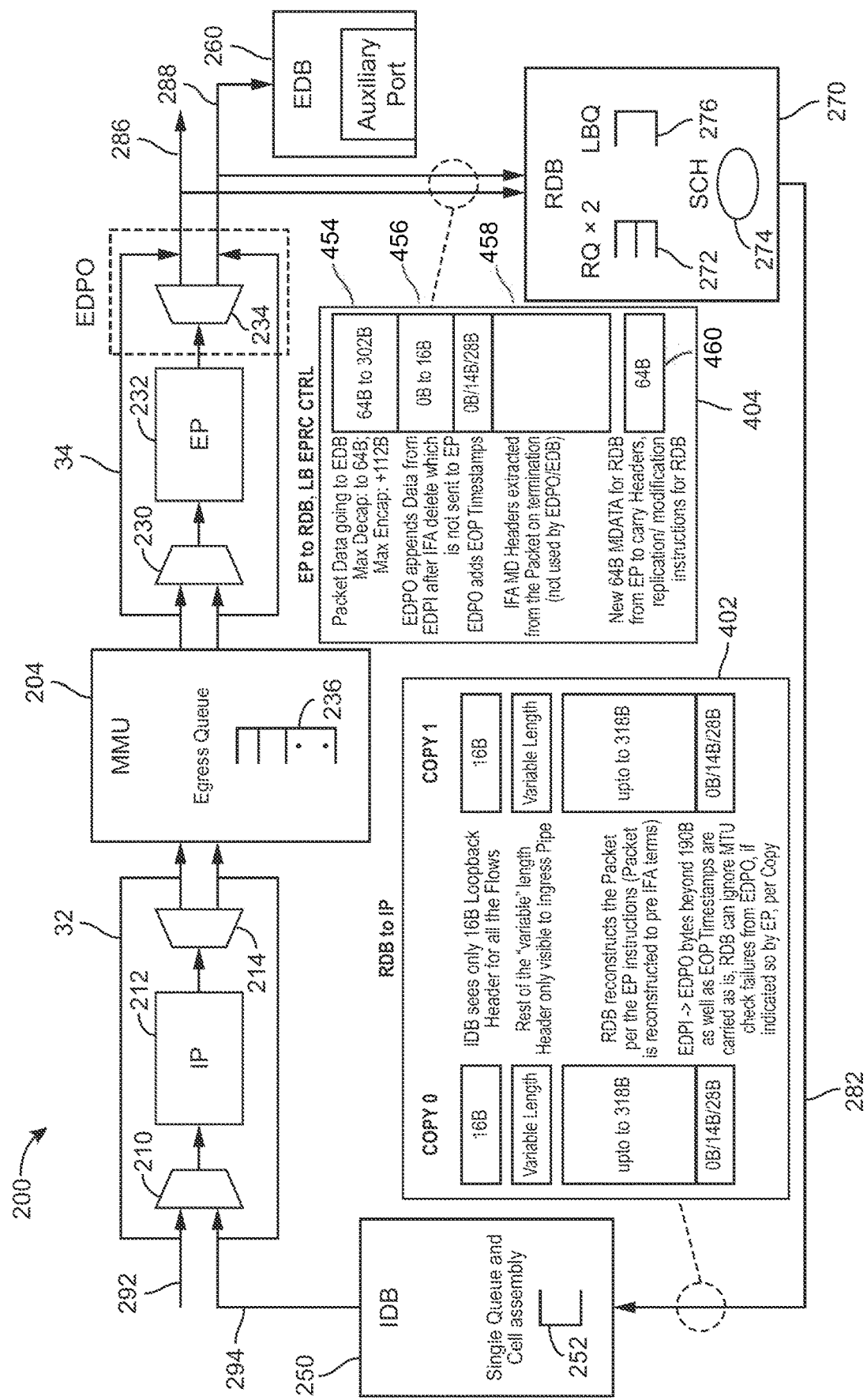
FIG. 4 is a more detailed block diagram of data packets being processed in the portion of the ingress pipeline and egress pipeline illustrated in FIG. 3 according to some embodiments.

With reference to FIG. 4, a two packets 402 are provided for recirculation to ingress data buffer 250 at port 282. In some embodiments, the ingress data buffer 250 includes a single cell queue and cell assembly unit 252. All packets coming on port 282 as loopback packets are stored in ingress data buffer 250 according to loop back schemes.

The ingress data buffer 250 sees a 16B loopback header 408, and variable length header 410 is only visible to ingress pipeline 32 in some embodiments. Packet portion 420 is reconstructed by the recirculation data buffer 270 using instructions from the egress pipeline 34 (e.g., packet is reconstructed per instrumentation protocol terms). Egress data processing output bytes greater than egress data processing input bytes beyond 190B as well as end of packet (EOP) timestamps are carried as is (e.g., in portion 422). The recirculation data buffer 270 ignores MTU check failures from the egress data processing output if indicated by the egress pipeline 34 per copy in some embodiments.

At port 286, data packet 404 includes packet data 454 being provided to egress data buffer 260. Packets from the egress data processing output are different from the packets for the egress data buffer 260. SOP and following MOP/EOP cell copies are different at the egress data processing output from at the recirculation data buffer 270. Data packet 404 also includes a portion 456 including appended data from the egress data processing output. The appended data includes data at egress data processing input that was subject to an IFA delete and was not sent through the egress processing pipeline 232. IFA refers to an instrumentation protocol. The data packet 404 includes a portion 456 including EOP time stamps added by the egress data processing output. A portion 458 of packet 404 includes IFA MDATA headers extracted from the packet on termination which are not required by the egress data processing output or the egress data buffer 260. A portion 460 of packet 404 includes new 64 MDATA from egress pipeline 34 for the recirculation data buffer 270 to carry headers, replication/modification instructions.

At the ingress data buffer 250, the packet header uses a bit to indicate a loopback or CPU transmission. The most significant byte of the internal header can be used to distinguish between SOBMH, CPU transmission, loopback, etc. At the output of multiplexer 210, the headers are overlayed on a data model header extending into the most significant bits if larger than 16B.

Portion 200 provides modifications as discussed in table I below according to some embodiments. Unified recirculation circuit 36 (FIG. 1) or egress processing pipeline 232, scheduler 276, and egress data buffer 260 can process rules to effect the operations of table I below. SEOP refers to a start and end of packet, SOP refers to a start of packet, EOP refers to an end of packet, and MOP refers to a middle of packet. CRC refers to a cyclical redundancy check. L1, L2, L3 and L4 refer to layers.

TABLE I

Cell Length an Modifications

| Type of Cell and Cell Length at the output of MMU 204 | EP Modifications and Drop indication | Expectations from other Blocks | Remarks |
|---|---|---|---|
| SEOP <= 190B | If this cell is decapped to less than 64B, it will be padded back to 64B by egress processing pipeline 232 | No special handling required by egress processing pipeline 232, egress data buffer 260, or recirculation data buffer 270. | Max decap by egress processing pipeline 232 to keep only: L2(14) + L3(20) + L4(8) |
| SEOP > 190B OR SOP | Non-IFA Term cases: egress processing pipeline 232 may decap the first Cell all the way to 14B. No Copy Valid for recirculation data buffer 270 | Egress processing pipeline 232 needs to pad the switched copy to 64B for egress data buffer 260, including CRC bytes, but excluding Tail TimeStamp. | Starting Byte for deletion is always fixed at 191B (which is part of the SOP cell as seen at the output of MMU 204). Egress processing pipeline 232 will not ask data path to delete CRC bytes in 191B to 206B |
| | IFA Term case: egress processing pipeline 232 may decap the first Cell all the way to 28B. Egress processing pipeline 232 will indicate the deletion to be done by egress processing pipeline 232, | If an IFA Termination case, egress processing pipeline 232, and/or egress data buffer 260 needs to delete the bytes as indicated by egress processing pipeline 232 after 190B. Egress processing pipeline 232 also needs to pad the switched (EDB) copy to 64B, including CRC bytes, but excluding Tail TimeStamp. Recirculation data buffer 270 should always | |

TABLE I-continued

Cell Length an Modifications

| Type of Cell and Cell Length at the output of MMU 204 | EP Modifications and Drop indication | Expectations from other Blocks | Remarks |
|---|---|---|---|
| MOP/EOP any length (next cell after SOP) | and/or egress data buffer, if required for 191B-206B If an IFA Termination case extending into the next cell after SOP, egress processing pipeline 232 will indicate the number of bytes to be deleted, at SOP itself | get the pre-IFA Termination bytes beyond 190B and pre-padding copy Egress processing pipeline 232, and/or egress data buffer 260 needs to delete the bytes as indicated by egress processing pipeline 232 in MOP/EOP cell. Recirculation data buffer 270 should always get the pre-IFA Termination MOP/EOP cells | The entire next cell may be deleted except the CRC bytes |

Network device 10 may also include other components not shown. For example network device 10 may include Ethernet port interface controllers, gigabit port interface controllers, internet port interface controllers, and additional buffers.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in port or destination quantity, data types, methods of reinsertion, reintroduction, etc., values of parameters, arrangements, etc.). For example, the position of elements may be reversed or otherwise varied, the connections between elements may be direct or indirect, such that there may be one or more intermediate elements connected in between, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure. For example, the embodiments of the present disclosure may be implemented by a single device and/or system or implemented by a combination of separate devices and/or systems.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer (i.e., ASICs or FPGAs) or any other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:
1. A network device, comprising:
an ingress pipeline;
an egress data buffer database;
an egress pipeline having an egress pipeline output coupled to an input of the egress data buffer database;
an ingress data buffer comprising a recirculation port; and
a recirculation data buffer coupled to the recirculation port and the egress pipeline output, wherein the egress pipeline and the ingress pipeline are configured to mark a packet for recirculation, wherein the packet is provided to the recirculation data buffer for provision to the recirculation port, wherein the ingress data buffer is configured to provide the packet to the ingress pipeline, wherein the recirculation data buffer comprises a scheduler configured to schedule both ingress and egress recirculation.

2. The network device of claim 1, wherein the recirculation port is a single recirculation port for the ingress data buffer.

3. The network device of claim 1, wherein the network device is an integrated circuit device.

4. The network device of claim 1, wherein the recirculation data buffer comprises a recirculation queue.

5. The network device of claim 4, wherein the recirculation data buffer comprises a loop back queue.

6. The network device of claim 1, wherein the egress data buffer comprises a single auxiliary port and the egress pipeline output is directly coupled to an input of the recirculation data buffer.

7. The network device of claim 1, further comprising:
a memory management unit disposed between the ingress pipeline and the egress pipeline and wherein the memory management unit is configured to provide for loop back packets according to credits in use between the memory management unit and the recirculation data buffer.

8. The network device of claim 1, further comprising:
additional ingress data buffers coupled to the ingress pipeline, wherein the additional ingress data buffers do not include a loop back port.

9. The network device of claim 8, further comprising:
additional egress data buffers coupled to the egress pipeline, wherein the additional egress data buffers do not include an auxiliary port.

10. A method of recirculating a packet, the method comprising:
marking a first packet for recirculation in an ingress pipeline;
providing the first packet to an egress pipeline;
providing the first packet from the egress pipeline to a recirculation data buffer, the recirculation data buffer being coupled to receive the first packet from an output of the egress pipeline; and
providing a copy of the first packet to an ingress data buffer from the recirculation data buffer, the ingress data buffer being coupled to an input of the ingress pipeline, wherein the recirculation data buffer comprises a scheduler configured to schedule both ingress and egress recirculation.

11. The method of claim 10, wherein the ingress data buffer comprises a single recirculation port and the copy of the first packet is provided to the single recirculation port.

12. The method of claim 10, further comprising:
marking a second packet for recirculation in the egress pipeline;
providing the second packet from the egress pipeline to an egress data buffer and a copy of the second packet to the recirculation data buffer; and
providing the copy of the second packet to the ingress data buffer from the recirculation data buffer.

13. The method of claim 12, wherein the ingress data buffer comprises a single recirculation port and the copy of the second packet is provided on the single recirculation port.

14. The method of claim 13, wherein the recirculation data buffer comprises a scheduler, and a recirculation queue for the second packet, wherein the recirculation data buffer is disposed between the egress pipeline and the egress data buffer.

15. The method of claim 14, wherein the recirculation data buffer comprises a loop back queue for the first packet.

16. An apparatus, comprising:
an ingress data buffer;
an ingress processor;
an egress processor;
an egress data buffer database; and
a recirculation data buffer, wherein the apparatus is configured to provide unified packet recirculation via the recirculation data buffer and a single recirculation port on the ingress data buffer, wherein the recirculation data buffer is disposed between the egress data buffer and an output of the egress processor, wherein the recirculation data buffer comprises a scheduler configured to schedule both ingress and egress recirculation.

17. The apparatus of claim 16, wherein the ingress processor, the egress processor, the recirculation data buffer and the ingress data buffer are disposed on a single integrated circuit.

18. The apparatus of claim 16, further comprising:
unified packet recirculation software comprising instructions stored on a non-transitory media for configuring the apparatus to provide the unified packet recirculation.

19. The apparatus of claim 18, further comprising a memory management unit between the egress processor and the ingress processor, wherein the instructions reserve space for loop back packets according to credits in use between the memory management unit and the recirculation data buffer.

20. The apparatus of claim 16, wherein the recirculation data buffer is configured to copy or edit a packet and provide the copied or edited packet to a recirculation port on the ingress data buffer.

* * * * *